Dec. 19, 1961     P. W. COLLYER     3,013,465
REFRACTOMETER FOR INDUSTRIAL PROCESS CONTROL
Filed July 6, 1956     7 Sheets-Sheet 1

INVENTOR
PHILIP WARDHAM COLLYER
BY
*John C. Blair*
ATTORNEY

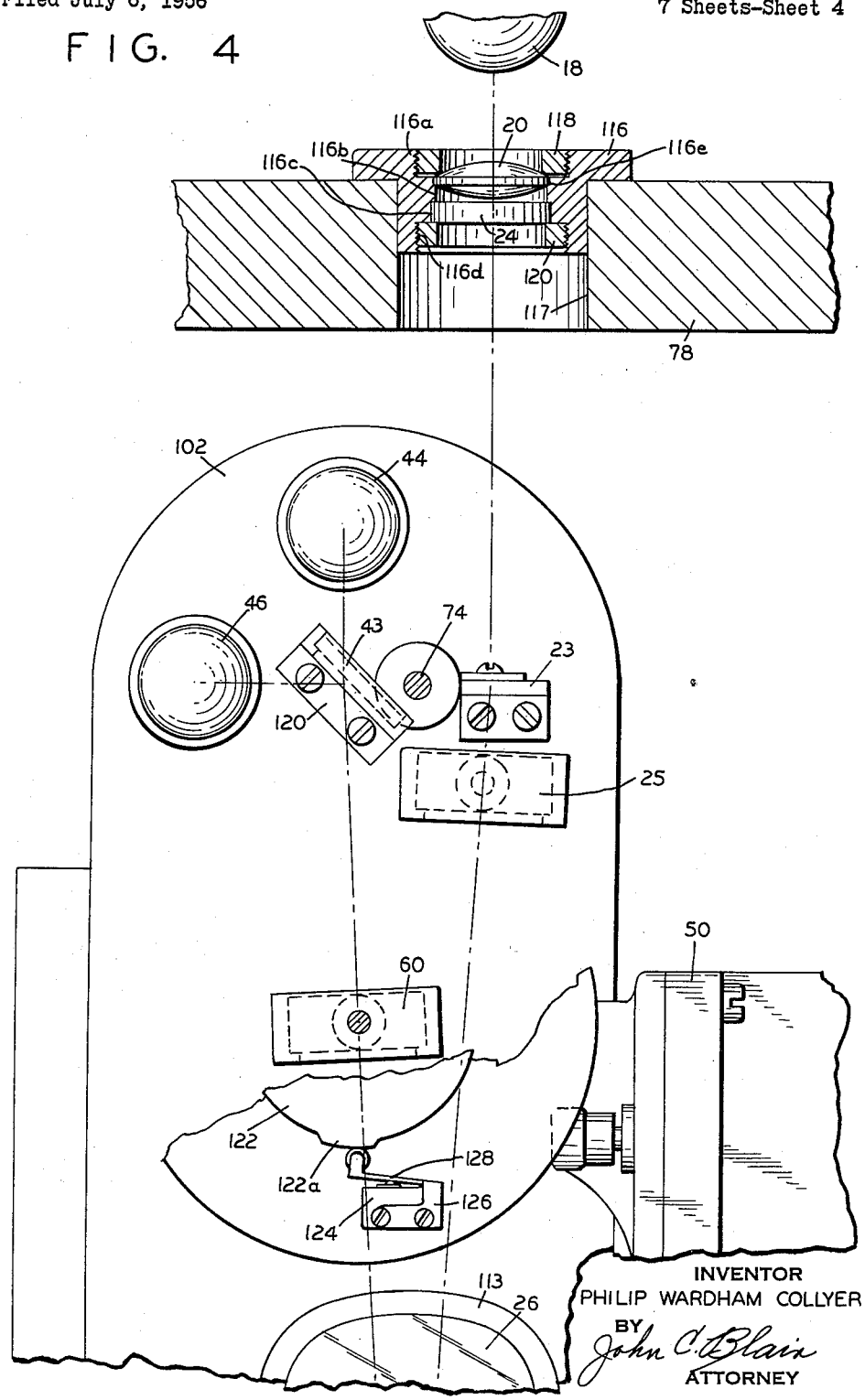

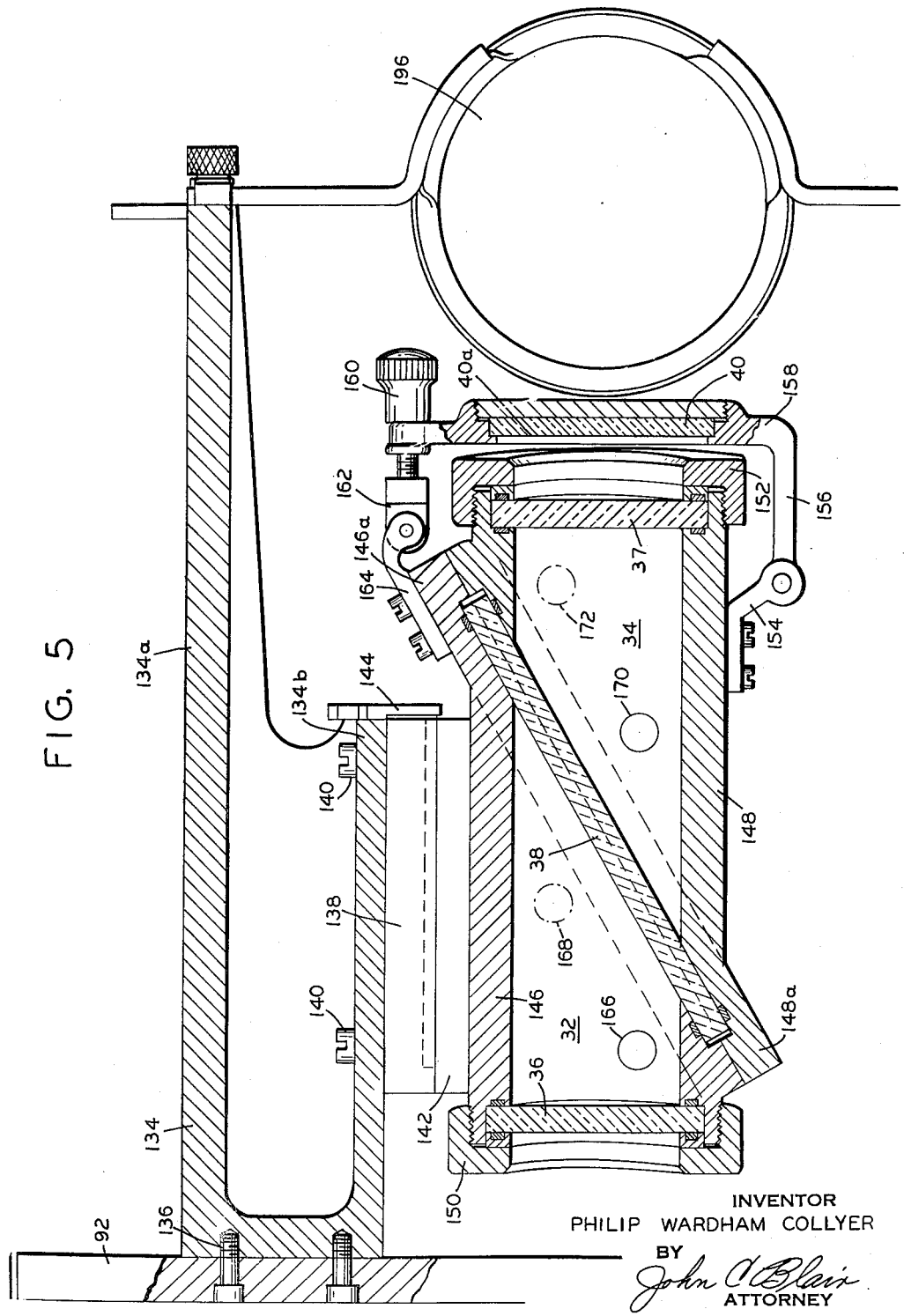

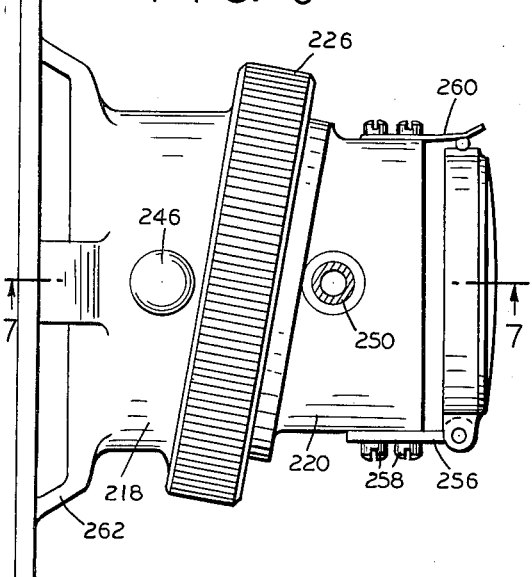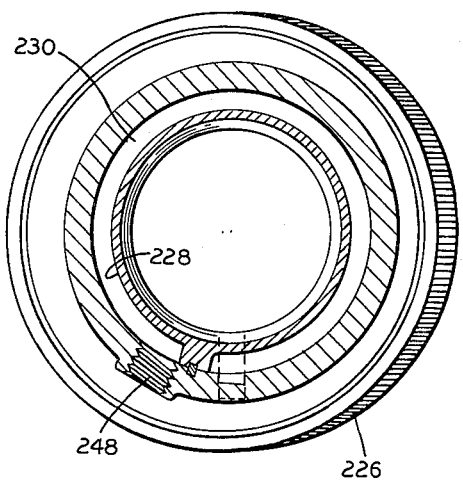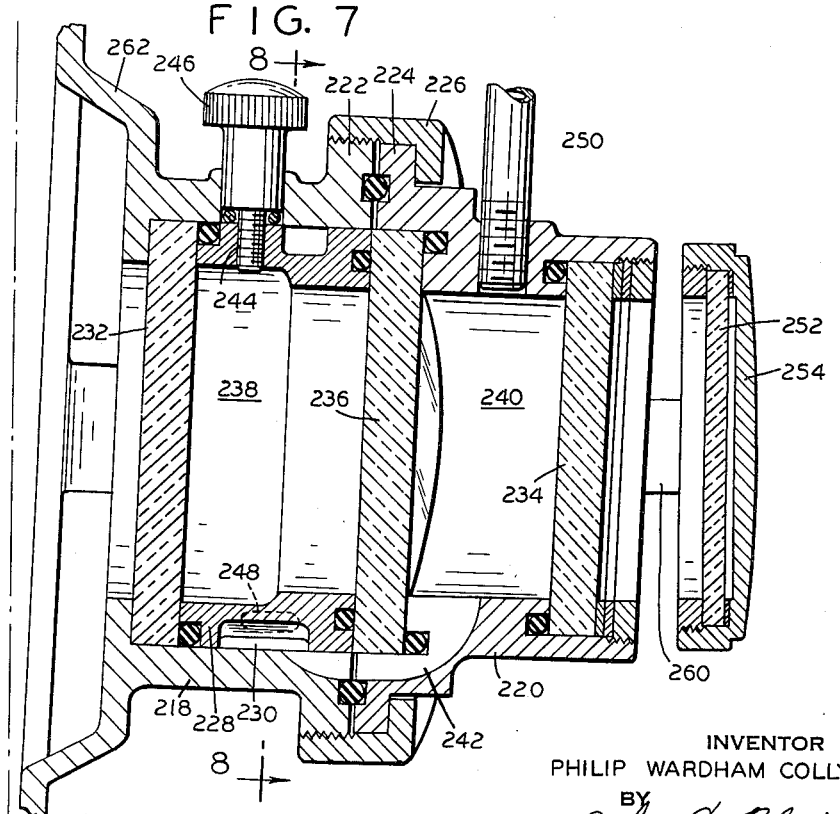

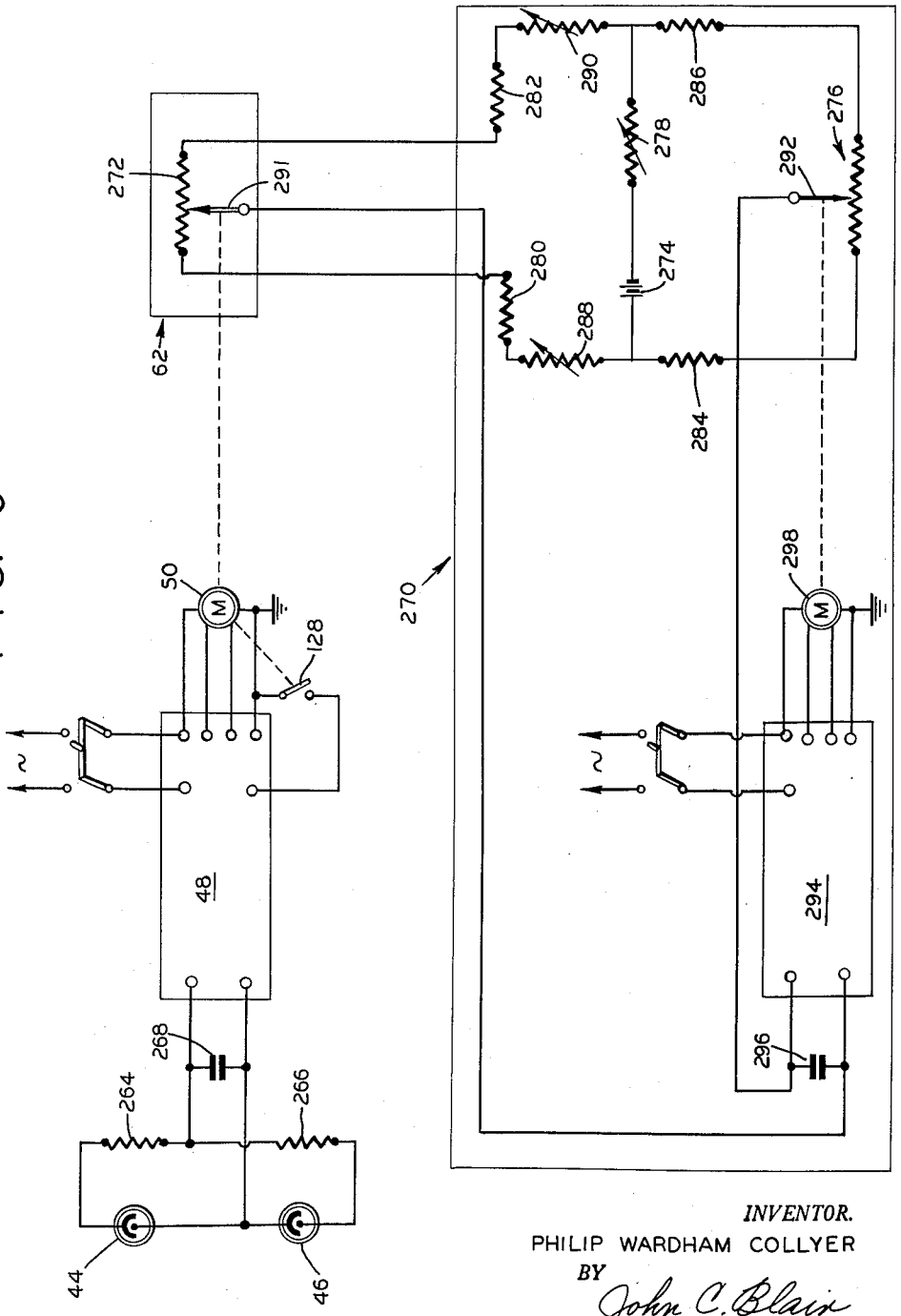

United States Patent Office 3,013,465
Patented Dec. 19, 1961

3,013,465
REFRACTOMETER FOR INDUSTRIAL PROCESS CONTROL
Philip W. Collyer, Stamford, Conn., assignor to Barnes Engineering Company, Stamford, Conn.
Filed July 6, 1956, Ser. No. 596,302
11 Claims. (Cl. 88—14)

This invention relates to an improved refractometer for use in industrial plants and laboratories. More specifically, it relates to a refractometer capable of making accurate measurements of variations in the refractive index of a moving fluid stream, recording such variations and controlling the stream composition to minimize them if desired.

It is known that changes in the concentration of a chemical element in a fluid may cause changes in its refractive index; it is also known that the concentration of certain dissolved substances may be determined by measuring the refractive index of the solution. Thus refractometers to measure the refractive index of fluids are useful both in analytical laboratories and in industrial process control. The most accurate refractometers are the "differential" type in which the difference in refractive index between the fluid under test and a reference fluid is measured.

Differential measurement is accomplished by passing a light beam through two joined transparent vessels having a common wall which is not normal to the light beam. One vessel contains a reference fluid and the other fluid whose index of refraction is to be measured, which will be called here the "sample fluid." If the fluids in both vessels have the same refractive index, the light beam emerges from the second vessel on a path parallel to the path on which it entered the first vessel. However, if the index of refraction of one of the fluids is different from the other, the emerging light will follow a path at an angle to the path of the entering light. This angular deviation may be measured and is directly related to the difference in refractive index of the two fluids. If the sample fluid is a moving stream, the deviation of the light beam may be measured, and this measurement used to maintain the refractive index substantially constant by controlling the concentration of chemical substances therein, or it may be used to provide an accurate record of the concentration of the chemical composition of the moving stream.

Differential refractometers for these purposes have heretofore used a slit source of monochromatic light arranged to pass through a two-chamber cell having a transparent dividing plane between them not normal to the light path, one chamber holding the reference and the other the sample fluid. After the light beam passes through the cell it is allowed to fall on apparatus which measures deviations in the light path. Conventionally this is accomplished by a pair of photocells. The two photocells are electrically connected to provide opposing signals so that when light from the cell illuminates one photocell more than the other, a net signal is generated which drives an electromechanical linkage to move either the light beam or the photocells so that each photocell is equally illuminated. This same mechanism may be used to provide an output signal or operate a recorder. Although refractometers such as I have described are useful, their use is fraught with many problems, particularly when they are used as process control instruments.

One of the most important of these problems is controlling the relative temperatures of the reference and sample fluids. The refractive index of fluids varies with temperature; thus if the reference and the sample fluid are at different temperatures when their refractive index is being measured, a light beam passing through a differential refractometer containing them will be deviated though no difference of refractive index exists at like temperatures. Since it is sometimes desired to measure refractive index to an accuracy of one part in a hundred thousand, it is apparent that such temperature variation may result in important inaccuracies. A second problem associated with prior refractometers utilizing glass deviation restoring plates which are rotated to correct beam position and equally illuminate the measuring photocells is the necessity for measuring the tangent of the angle through which the restoring plate is turned, rather than the angle itself. This proves necessary since for angles of restoring plate rotation, say up to about 35°, the light deviation for a given rotation is approximately proportional to the tangent of the angle through which the plate is rotated rather than to the angle itself. To permit direct reading of the instrument, complicated linkages between the plate driving means and the plate are used.

Spurious reflections from the surfaces of the cell falling on the photocells also result in erroneous measurements. Coating the cell surfaces to increase the light absorption helps but does not eliminate such condition. Furthermore, prior refractometers were designed primarily for analytical laboratories and not suited for use in production plants being large, bulky and delicate in operation. They were usually not explosion-proof while the present refractometers are so designed. In short the refractometers of the present invention solve these and other problems peculiar to use in production plants.

Accordingly, it is an object of my invention to provide a differential refractometer suited for use in manufacturing or production plants which occupies a relatively small space and is of rugged, explosion-proof construction. Another object of my invention is to provide an improved temperature control system in a refractometer of the type described for maintaining the reference fluid and the sample fluid at substantially similar temperatures to minimize errors due to temperature differences. Still another object of my invention is to provide a refractometer of the type described having improved means for splitting the refracted light between the two photocells. A further object of my invention is to provide a refractometer of the type described having an improved drive for restoring the plate used to correct light deviation so that drive movement is directly proportional to changes in refractive index. A still further object of my invention is to provide means for eliminating spurious reflections from the face of the sample cell in a refractometer of the type described. Yet another object of this invention is to provide a refractometer in which errors resulting from the fact that the light source is not directly on the optical axis are reduced to a minimum. Other objects of the invention will in part be obvious and will in part appear hereinafter.

The invention accordingly comprises the features of construction, combinations of components, and arrangement of parts, which will be exemplified in the construction hereinafter set forth, and the scope of the invention will be indicated in the claims to follow.

For a fuller understanding of the nature and objects of the invention, reference should be had to the following detailed description taken in connection with the accompanying drawings in which:

FIGURE 1 is a partially fragmentary perspective view of a refractometer made according to my invention, FIGURE 2 is a pictorial schematic view diagrammatically illustrating the operation of such a refractometer, FIGURE 3 is a vertical section through the refractometer, some parts being shown in elevation for purposes of greater clarity, FIGURE 4 is a section along the line 4—4 of FIGURE 3 showing in its upper portion the light source and the deviation measuring portion of the refractometer therebelow.

FIGURE 5 is an enlarged sectional view taken along the line 5—5 of FIGURE 3, showing the construction of a refractometer cell and associated equipment.

FIGURE 6 is a plan view of a less elaborate cell forming another embodiment of the invention.

FIGURE 7 is a vertical sectional view taken along the line 7—7 of FIGURE 6.

FIGURE 8 is a vertical sectional view taken along the line 8—8 of FIGURE 7, and

FIGURE 9 is a schematic diagram of the electrical circuit of the refractometer and an associated motor driven recording potentiometer showing the inter-connections therebetween.

Similar reference characters refer to similar parts throughout the several views of the drawings.

Figure 1:
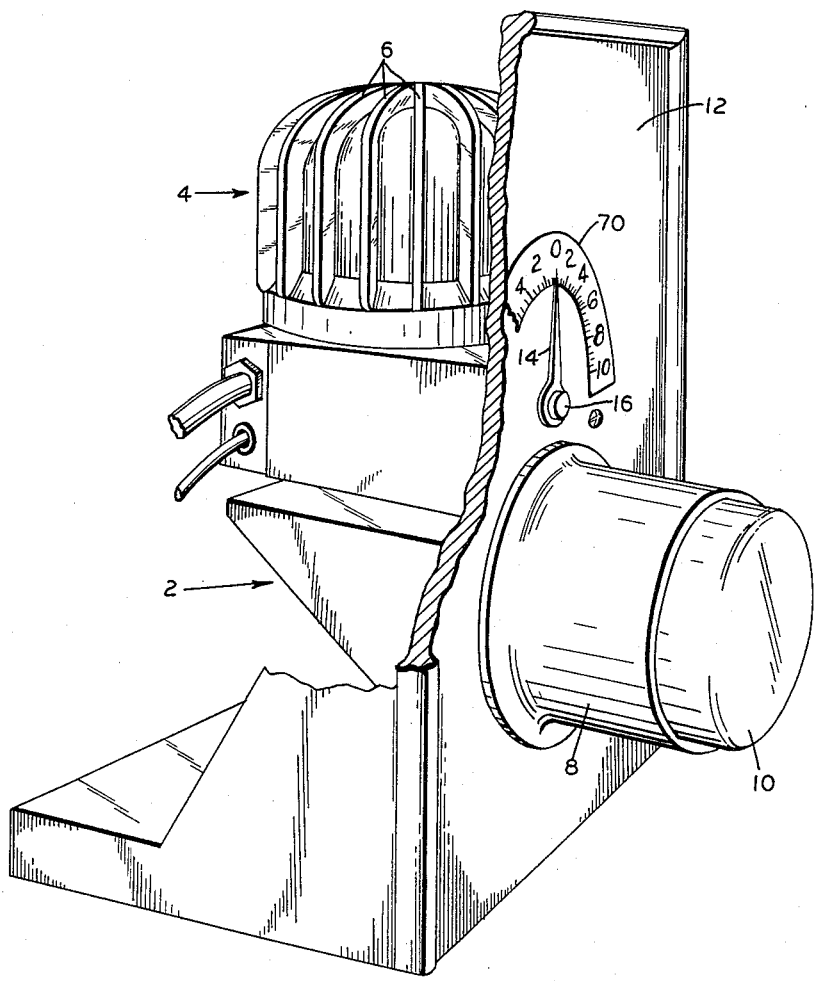

As shown in FIGURE 1, the housing for my refractometer includes a main casing generally indicated at 2 to which is attached a dome-shaped cover generally indicated at 4 having cooling fins 6 preferably integral therewith. A cylindrical housing 8 is attached to casing 2 and projects outwardly from the front face thereof, its outer end being closed by a second dome-shaped cover 10. The refractometer is suitably mounted on a panel 12 with cylindrical housing 8 extending outwardly therefrom. If desired, a pointer 14 may be secured to a shaft 16 operated by the refractometer and extending through panel 12 to give relative indications of variations in the refractive index of the sample fluid. Electrical and fluid connections are made in the rear of main casing 2.

Figure 2:
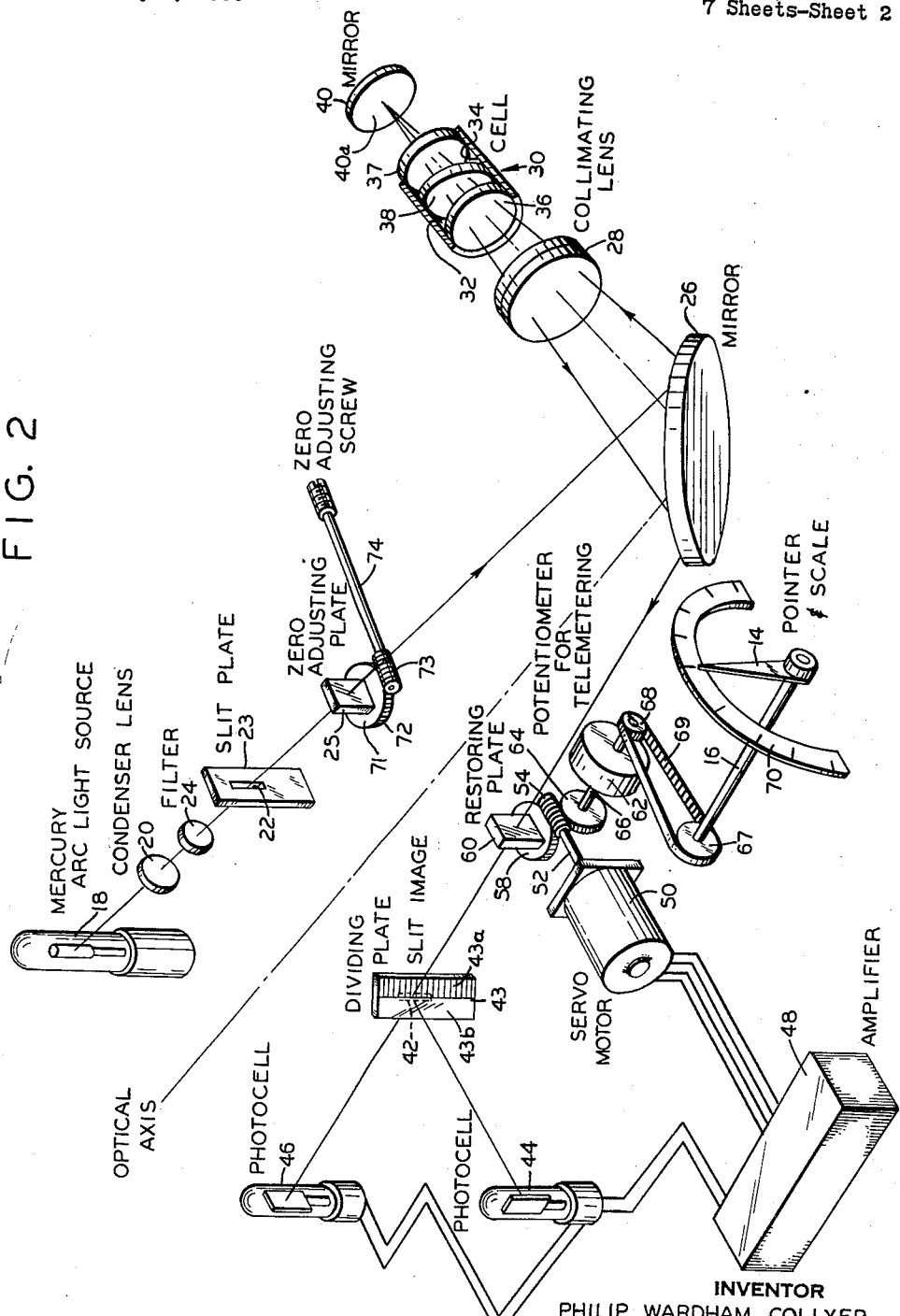

The operation of a refractometer made according to my invention can best be understood by reference to FIGURE 2, in which light from light source 18 is focused by condenser lens 20 on slit 22 in plate 23. A filter 24 is interposed between lens 20 and slit 22 to render the light emanating from slit 22 monochromatic. Although any light source and any filter might be used, a mercury arc light source in combination with a green filter having high transmission at 5461 A. and low transmission at other wavelengths produces particular strong monochromatic light. Light from slit 22, after passing through zero adjusting plate 25, is allowed to fall on mirror 26 which is set at approximately 45°; thus light is reflected from the mirror at approximately 90° to the incident light from slit 22 and, as shown in FIGURE 2, travels from the mirror through a collimating lens 28 and through the transparent cell generally indicated at 30. A transparent plate 38 divides cell 30 into two chambers 32 and 34 containing the sample and reference fluids. The ends of the cell are closed by transparent covers 36 and 37. Light passing through lens 28 and collimated thereby falls on transparent cover 36. In most refractometers, cover 36 is disposed perpendicular to the incident light beam so that the light passes therethrough without bending. For reasons to be discussed hereinafter, in my refractometer, the cell is disposed at a slight angle with respect to the incident light beam in both the horizontal and vertical planes. Accordingly, light from collimating lens 28 is slightly displaced as it passes through cover 36, but is not deviated thereby because the surfaces of cover 36 are parallel. The light then passes through the sample fluid in chamber 32 and strikes transparent plate 38 where the light rays are refracted; they are refracted in the opposite direction as they emerge from plate 38 into the chamber 34 filled with the reference fluid. If the fluids in both chambers have the same refractive index, the amount of refraction which takes place at both surfaces of plate 38 will be the same and the light will again be displaced but not deviated.

The light beam next passes through transparent end cover 37 and strikes mirror 40 to be reflected back through cell 30. Mirror 40 is mounted so that its reflecting surface 40a is normal to the optical axis of the system, i.e. normal to the axis of the collimating lens 28. Hence, since the incident light beam is slightly inclined to such optical axis, light passing through the cell, striking the mirror and being reflected back through the cell will be focused not at the source, i.e. slit 22, but at a point 42 on the other side of the optical axis.

By locating mirror 40 normal to the optical axis with the slit source slightly offset therefrom, errors are greatly minimized. Where in the past a single lens, such as collimating lens 28, was used both to collimate light incident on the cell and also to focus light reflected from mirror 40, the usual practice was to place the light source on the system axis and tilt mirror 40 with respect thereto. This resulted in the incident and reflected light passing through the cell at different angles, and subjected reflected light to considerable error. When the light beam passes through the cell obliquely, the deviation of the beam is not only dependent upon the differences of refractive index of the fluids therein, but also upon the angle the beam makes with the optical axis. By causing both the incident and the reflected beam to pass obliquely through the cell at substantially equal angles to the optical axis, the effects of such oblique passage are cancelled, and beam deviation is substantially dependent only on differences in refractive index. Also, since both incident and reflected beams pass through similar portions of the collimating lens, the effect of lens aberration is minimized.

If the fluids in chambers 32 and 34 have different refractive indices, then the two refractions at the surface of plate 38 will not cancel but one will be greater than the other. This will cause a deviation of the light which will be approximately doubled upon the second passage of the light through the cell after reflection. This variation in the direction of the light rays will result in the light focusing not at the point 42 but at some point closer to or further from the optical axis. Thus as the refractive index of the fluid in chamber 32 changes with respect to the fluid in chamber 34, the point of focus of the reflected beam will describe an arc, the center of the arc being point 42. Positioned at the point of focus of the reflected beam is a half silvered mirror which serves as a light dividing plate 43 or "beam splitter." This mirror is half silvered in the sense that one half 43a is fully silvered to form a mirror, whose edge is parallel to the long dimension of the image of slit 22 formed at point 42 and the other half 43b is transparent. Thus, if the refractive index of the fluid 34 changes to change the direction of the light beam reflected from mirror 40, the image of slit 22 will either fall more on the reflecting portion or on the transparent portion of dividing plate 43. Light falling on the reflecting portion of plate 43 is reflected to photocell 44, while light falling on the transparent portion is transmitted and falls on photocell 46. These two photocells are connected in opposition and consequently when the light from the cell 30 illuminates them equally no output signal will appear at the input terminals of an amplifier 48 connected thereto.

If because of a difference in the refractive index between fluids in chambers 32 and 34 of the cell, the image of slit 22 on dividing plate 43 moves either into the transparent or silvered area, photocell 44 or 46 will conduct more current, the reverse being true of the other cell. This will result in an input signal to amplifier 48, which may drive a conventional two phase servo-motor 50; this motor may in turn drive a shaft 52 through a gear train (not shown). A worm 54 on shaft 52 meshes with and drives a rotatable holder 58 on or in which is mounted a transparent glass restoring plate 60, through which the reflected light beam from cell 30 passes.

Plate 60 is a relatively thick piece of glass and as it is rotated from a position normal to the light beam, it will deviate the beam. Accordingly, by rotating plate 60 when the beam from cell 30 deviates from point 42, it may be made to correct such deviation so that the beam will fall equally on photocells 44 and 46. More particularly, if the light beam passing through restoring plate 60 no longer falls equally on photocells 44 and 46, they will generate a signal, which, after amplification, drives motor 50 to rotate holder 58 on or in which the restoring plate is mounted. Motor 50 is so connected to the photocells and amplifier that it always rotates the restoring plate in a correcting direction, i.e. to restore the beam to point 42, thereby illuminating photocells 44 and 46 equally.

It has been found that by using a very thick restoring plate, the angle of rotation of plate 60 is substantially proportional to the refractive index difference between the sample and reference fluids and the resultant light beam deviation. It is, therefore, unnecessary to introduce a tangent drive to measure the amount of deviation. A precision potentiometer 62 is preferably connected to and driven by motor 50, e.g. by worm 54, and worm gear 64 mounted on the shaft 66 of potentiometer 62. As will be described in detail hereinafter, potentiometer 62 provides an output signal which may be used to record refractive index changes of the sample either close to the refractometer or at a remote location, or to control an external process, since movement of the contact of potentiometer 62 is directly proportional to the differences in refractive index of the fluids in the chambers 32 and 34. Additionally the pointer 14, affixed to shaft 16 may be driven from potentiometer shaft 66 by suitable means such as pulley 67, belt 69 and pulley 68. A scale 70 may be mounted adjacent pointer 14 to indicate the relative variations in refractive index of the sample fluids.

Zero adjusting plate 25, preferably similar to restoring plate 60, may be manually rotated to adjust the position of the image of slit 22 as it appears on dividing plate 43, and to provide equal output signals from photocells 44 and 45 when the fluids in chambers 32 and 34 have equal indices of refraction. Plate 25 is schematically shown mounted on rotatable plate 71 having a worm gear 72 meshing with a worm 73 on manually adjustable shaft 74.

It will now be apparent that the refractometer schematically illustrated in FIGURE 2 may be calibrated by first placing in chambers 32 and 34 a fluid having the desired properties, e.g. whose composition is such that the refractive indices in both chambers are identical. The zero adjusting screw 74 is then turned to position the adjusting plate 25 so that the beam passing through the restoring plate will be divided equally on the half-silvered and silvered surfaces of the mirror 43 in the manner described above. Accordingly, photocells 44 and 46 will conduct equally. The fluid in the reference chamber 34 of the cell 30 is retained therein, and now sample fluid may be continuously run through the chamber 32, as the refractometer commences operation in the manner described above. Any change in refractive index of the samples indicating a change in composition will instantaneously cause deviation of the beam passing through the restoring plate to the dividing plate, with resulting operation of the photocells and the amplifier 48, the servomotor, etc. in the manner described above.

Thus far I have described the construction and operation of my improved differential refractometer in general terms as applied to the schematic representation found in FIGURE 2 of the drawings, with the intention of conveying a general understanding of this apparatus and its functions. To more fully understand the details of the preferred construction we now turn to FIGURE 3, in which the main casing 2, containing the remainder of the refractometer sub-assemblies, is roughly trapezoidal in cross-section. The upper portion of the casing is provided with an annular flange 76 threadably engaging the inner lower surface of dome-shaped cover 4. The inner surface of flange 76 is counter-bored to provide a groove 76a for the reception of the shoulder 78a of an optical mounting disk 78, having mounted thereon the light-source optics.

The front surface 80 of main casing 2 is flat to rest against panel 12 upon which it is supported; a large opening 82, therein, faces housing 8, in which the light beam from the light-source optics in mounting 78 passes to the cell 30 which is mounted therein in a manner to be presently described. Casing 2 is counter-bored to provide a recess 84 and an annular supporting flange 86. The left hand end of housing 8, as viewed in FIGURE 3, fits into recess 84 against flange 86, being held in such position by screws 90. A plate 92 resting upon and being suitably secured to an annular shoulder 94 thereon, closes the left hand end of housing 8. A mounting 96 for collimating lens 28 is threadably received in an aperture in plate 92.

Figure 3:
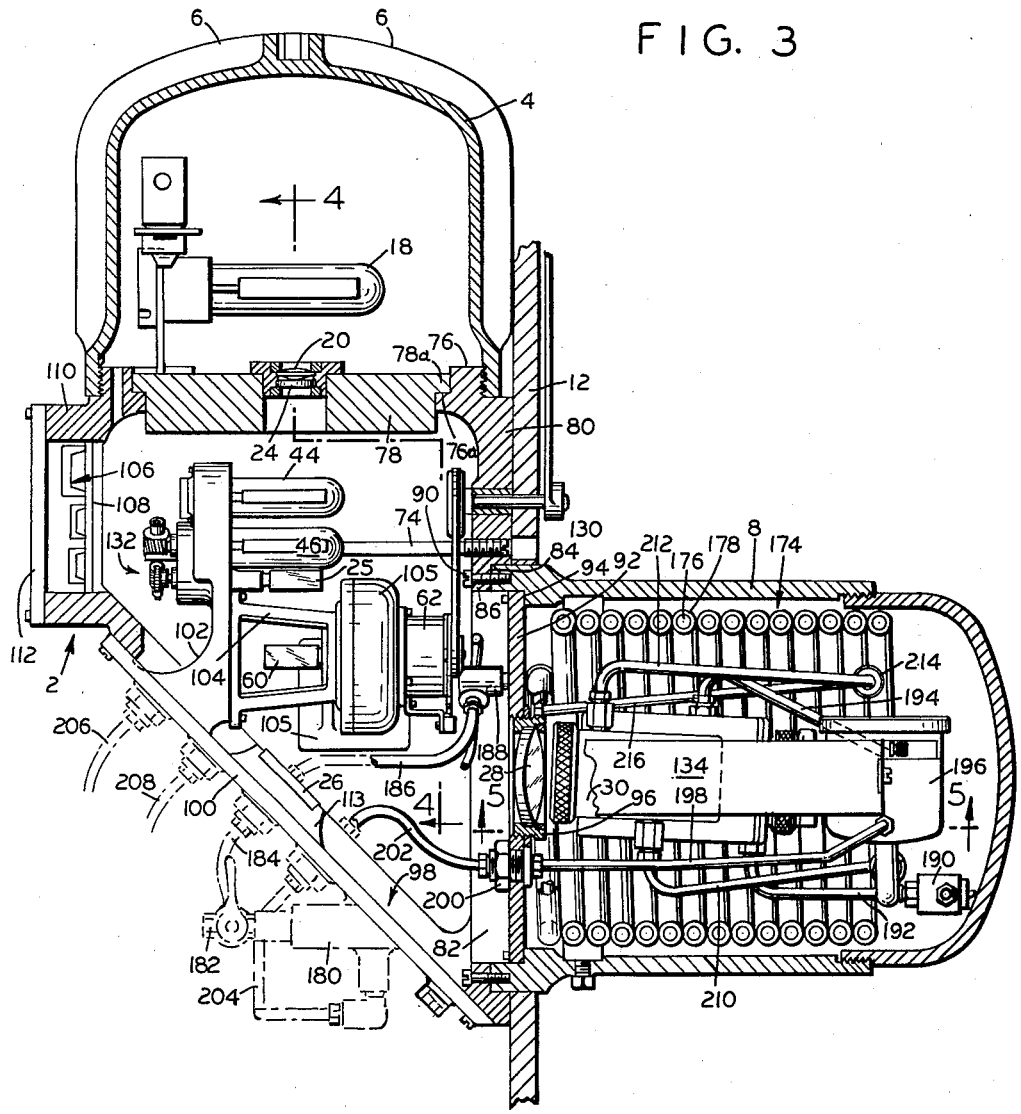

Still referring to FIGURE 3, the inclined lower portion of the rear surface of casing 2 has an opening 98 closed by cover plate 100 removably attached thereto. This cover plate supports equipment to be presently described. A bracket 102, secured to the inner surface of plate 100 and extending upwardly therefrom, supports photocells 44 and 46, dividing plate 43 (FIGURE 4) and zero adjusting plate 25. A spider member 104, extending to the right (FIGURE 3), supports a housing 105 containing the gearing associated with the servo-motor 50, which extends rearwardly (to the right in FIGURE 4). Potentiometer 62 is also supported on housing 105 and is suitably connected to the gear train in the casing.

Terminal strips generally indicated at 106 are mounted on a plate 108 fitting on an upper rear extension 110 of main casing 2, and a cover plate 112 fits thereover to provide a junction box for the terminals. Preferably a mounting 113 on the inner surface of cover plate 100 supports mirror 26 in position to receive a light beam from the light source 18 and reflect it to the cell 30 in housing 8; mirror 26 is also in a position to receive a return light beam from cell 30 and direct it to restoring plate 60 and dividing plate 43, all in a manner to be described in greater detail presently.

Mercury vapor lamp 18 positioned in cover 4 and serving as the light source for the optical system, projects light through condenser lens 20 and filter 24, which are supported in optical mounting disk 78. As best seen in FIGURE 4, a collar 116 is supported in a hole 117 in plate 78. This collar is counterbored to provide the stepped grooves 116a, 116b, 116c and 116d, groove 116b being further reduced to provide the annular shoulder 116e. Lens 20 is supported in groove 116b and on shoulder 116e where it is held in position by a retaining ring 118 threaded in groove 116a. Similarly filter 24 fits in groove 116c and is held in position by retaining ring 120 threaded in groove 116d. As previously explained, lens 20 focuses the light from lamp 18 on slit 22 in slit plate 23 (FIGURES 2 and 4) to form a high intensity monochromatic slit source of light at plate 23. Zero-adjusting plate 25, extending from bracket 102 (FIGURE 3), is below plate 23 (FIGURE 4), so that light from slit 22 passes therethrough to strike mirror 26. Referring to FIGURE 3, it can be seen that this light beam striking mirror 26 is bent substantially at right angles to pass through the opening 82 of casing 2 and collimating lens 28, which is supported in mounting 96 as previously described. Cell 30 is supported in housing 8 in front of lens 28, with mirror 40 therebehind, so that the light beam from mirror 26 passes through lens 28 and through cell 30 to be reflected back by mirror 40 to again strike mirror 26.

Referring to FIGURE 4 the returning light beam from mirror 26 passes through restoring plate 60 which extends from and is mounted on housing 105 (FIGURE 3) above mirror 26. A bracket 120 extends from bracket 102 to support dividing plate 43 above restoring plate 60 and adjacent photocells 44 and 46 which are connected through the terminal strips 106 to the amplifier 48 which is outside casing 2. The output of the amplifier 48 is fed to servo-motor 50 which is suitably supported behind housing 105, as best seen in FIGURE 4. As previously described with reference to FIGURE 2, motor 50 adjusts the position of plate 60 to maintain equal amounts of reflected light from mirror 26 on the two photocells 44 and 46. Servo-motor 50 also drives potentiometer 62 through suitable gearing in housing 105, all as diagrammatically indicated in FIGURE 2, the structural details thereof not being shown in FIGURE 4.

A plate 122 (FIGURE 4) having a cam surface 122a is associated with shaft 66 which is diagrammatically indicated in FIGURE 2 to kick a micro-switch 124 mounted on bracket piece 126 with an arm 128. Microswitch 128 is inter-connected with the amplifier 48 to signal that the refractometer control system has reached a limiting control position or the end of its travel in one direction.

As previously mentioned, the position of adjusting plate 25 may be controlled from the front of panel 12 via shaft 74 (FIGURE 3) to position the light beam so that the refracted beam from cell 30 falls equally on photocells 44 and 46 when the fluids in cell 30 have identical refractive indices. More particularly, plate 25 may be adjusted by turning shaft 74 thereby to actuate the gear train generally indicated at 132.

Cell 30 and many of its important associated parts are enclosed in housing 8 and cover 10 (FIGURE 3); further details of the preferred type of cell and mounting being shown in FIGURE 5. Turning now to FIGURE 5, a bracket piece 134 having arms 134a and 134b is connected to mounting plate 92 by screws 136. A block 138 is connected to arm 134b by screws 140. A second block 142 is secured to the cell and is longitudinally keyed to block 138, being held in position by a removable stop 144. Thus the cell is not only accurately located in the refractometer but may also be easily removed for cleaning or other service.

Cell 30 is made up of two similar castings 146 and 148 which are preferably rectangular in lateral cross section with circular longitudinal bores forming the chambers 32 and 34. Castings 146 and 148 have engaging flanged ends 146a and 148a which are suitably shaped to hold therebetween plate 38 which, as can be seen in FIGURE 5, is supported at a suitable angle to the cell axis to separate chambers 32 and 34. The ends of castings 146 and 148 are counter-bored to receive transparent covers 36 and 37 which are held in such position by capping rings 150 and 152 which are threaded thereon. Plates 36, 37 and 38 are suitably gasketed to provide necessary liquid seals throughout the cell 30. Bracket pieces 154 and 156 pivotally support mirror support 158 in which mirror 40 is seated. More particularly, mirror support 158 pivots about bracket piece 154 and is adjustably supported by thumb screw 160 threaded into a nut member 162 pivotally connected to bracket 164. The angle of mirror 40 with respect to the axis of the optical system may be thus adjusted by way of thumb screw 160. This angle is preferably not normal to the longitudinal axis of the cell, being on the order of 2° therefrom. In the preferred system cell 30 and mirror 40 are so related that mirror 40 is normal to the optical axis of collimating lens 28 (FIGURE 3), with the cell at a slight upward angle as viewed in FIGURE 3.

The tilt illustrated in FIGURE 3 insures that any incident light reflected from the surfaces of transparent plates 36 and 37 (FIGURE 5) will be reflected to a position sufficiently remote from the photocells that it cannot cause spurious signals therefrom. Furthermore, by spacing the light source and the measuring apparatus on opposite sides of the optical axis at substantially equal distances therefrom, as illustrated in FIGURE 2, a source of error in refractive index measurements made with any two-compartment differential cell in which the light traverses the cell in an off-axis fashion is eliminated. This arrangement also minimizes the effects of off-axis aberrations of the collimating lens.

Referring again to FIGURE 5, it will be noted that chambers 32 and 34 of cell 30 have ports 166, 168, 170 and 172 formed therein. A heat exchanger generally indicated at 174 (FIGURE 3) comprising co-axial inner and outer tubes 176 and 178 is helically coiled within housing 8, and the reference fluid is illustratively connected to flow through the annular space in tube 178 over tube 176 before entering chamber 34 of cell 30. A pump 180 mounted on housing 2 (FIGURE 3) has its outlet connected to tube 178 via valve 182, pipe 184, pipe 186, and fitting 188. After circulating through pipe 178 the reference fluid passes through valve 190 and is carried via tube 192 to port 172 of chamber 34 (FIGURES 3 and 5); it then leaves chamber 34 through port 170 and tube 194 to a reservoir 196 suitably designed to remove bubbles from the fluid. From reservoir 196 the reference fluid flows through tube 198 (FIGURE 3), fitting 200 in mounting plate 92 and tube 202 to a similar fitting on the diagonal surface of housing 2 contiguous to cover plate 100, and then through tube 204 to the inlet of pump 180 to complete the recirculation cycle.

The sample fluid enters through inlet tube 206 and exits via outlet tube 208 connected to housing 2 by suitable fittings. Tube 206 is connected to the inlet of tube 176 of heat exchanger 174, so that the sample fluid is made to flow through tube 176 in heat exchange relation with the reference fluid in tube 178. Accordingly, should there be any temperature differential between these fluids it is substantially eliminated in the heat exchanger. After flowing through tube 176 the sample fluid is directed via tube 210 to inlet port 168 of sample chamber 32 in cell 30 and tube 212 is connected to outlet port 166 thereof and to connection 214. A tube 216 returns the sample fluid to a fitting on plate 92 from where it is returned by tubing (not shown) to the outlet tube 208. Thus provision is made for circulation of both sample and reference fluids through heat exchanger 174 and through the chambers 32 and 34 respectively of cell 30, thereby to maintain the reference fluid at the same temperature as the incoming sample fluid and eliminate errors due to temperature differential.

Some applications of the refractometer do not require the precision of measurement possible with cell 30 illustrated in FIGURE 5 and its associated heat exchanger 174. For such applications, the simpler cell illustrated by the drawings of FIGURES 6, 7 and 8 will measure the refractive index of a sample having varying temperatures accurately to the fourth rather than the fifth decimal place. As shown in FIGURE 7 the cell body is made up of two castings 218 and 220. Each casting is flanged as at 222 and 224 and a retaining ring 226 is threaded thereover to hold castings 218 and 220 with suitable gasketing. A third casting 228 generally cylindrical in shape and preferably made of brass, copper or other material of high heat conductivity is inserted in the central bore of casting 218 and has a circumferential groove 230 in its outer surface, forming an annular passage of gradually increasing area. Suitably gasketed transparent end covers 232 and 234 are mounted on each end of the cell. A glass plate 236 separates the central bore of the cell into two chambers 238 and 240 and is rigidly and tightly supported between castings 218 and 228. A passage 242 is provided within castings 218 and 220 leading from circumferential groove 230 to chamber 240 in casting 220, hereinafter referred to as the sample chamber. Chamber 238 formed in casting 218 is filled with the uncirculated reference fluid, through opening 244 and sealed with thumbscrew 246 (FIGURES 6 and 7). The sample fluid flows through inlet port 248 (FIGURE 8) into circumferential groove 230 surrounding reference chamber 238, where for a time it is in thermal exchange relation with the reference fluid. As it flows through groove 230, separated from the reference fluid only by the wall of casting 228, it will achieve a temperature very close to that of the reference fluid. The sample fluid then passes by way of passage 242 into chamber 240 and exits therefrom via outlet port 250 (FIGURE 7). Thus, by circulating the moving stream of sample fluid around the reference fluid, the sample fluid and reference fluid achieve similar temperatures and erroneous indications in index of refraction of the sample fluid are minimized. In some applications it may be desirable to circulate the reference fluid also, and this may be accomplished by including a second port leading from chamber 238.

Mirror 252 is supported and positioned with respect to the cell of FIGURE 6 by mirror mounting 254 (FIGURES 6 and 8), which is pivotally connected to bracket 256 secured to casting 220 by screws 258; mirror 252 is held in the correct position by spring 260. As shown in FIGURE 6, mirror 252 is preferably mounted substantially normal to the axis of the cell as viewed from above in FIGURE 6, but as shown in FIGURE 7 at an angle of about two degrees with respect to the cell axis as viewed from the side. The cell, which may be secured to optical mounting plate 92 of FIGURE 3 by mounting flange 262, is also mounted at a two degree angle. Thus the cell is tilted at an angle of two degrees with respect to the optical axis but mirror 252 is normal to it. As previously explained, this insures that incident and reflected light are separated, and that incorrect indications of refractive index caused by spurious reflections from the surfaces of the glass plates which compose the cell are eliminated.

A typical circuit showing the manner in which this refractometer may be used to provide an external indication or control signal is illustrated in FIGURE 9. The photocell 44 is connected in series with resistor 264, and photocell 46 in series with resistor 266, resistors 264 and 266 being substantially equal in value. The series combinations of photocells and resistors are connected in parallel across the input terminals of amplifier 48, with the photocells arranged in opposing polarity. Photocells 44 and 46 are preferably of the photovoltaic type which require no plate potential. Accordingly, if the cells are equally illuminated, they will generate substantially equal currents, but the currents will flow in opposite directions, and hence there will be no input signal to amplifier 48. However if cell 44 is illuminated more than cell 46, it will generate a proportionally greater current, causing a signal of positive polarity to appear at the amplifier input. If cell 46 is illuminated more than cell 44, the signal at the amplifier input will be negative. Capacitor 268 is also connected across the amplifier input to aid in damping the control system. Resistors 264 and 266 may be the internal resistances of the cells 44 and 46 and separate external resistors may be unnecessary if the characteristics of the cells are substantially alike.

The signal appearing at the input of amplifier 48 is used after amplification to drive motor 50. Operation of motor 50 also operates potentiometer 62 as previously described, which is used to supply a signal to drive a recording circuit generally indicated at 270.

Still referring to FIGURE 9, fixed resistance element 272 of potentiometer 62 is supplied with current from battery 274, as is the potentiometer generally indicated at 276. Variable resistor 278 adjusts the total current drawn from battery 274 and the current flowing through the fixed resistance element 272 of potentiometer 62. Resistors 280 and 282 are bridge resistors associated with potentiometer 62 as are resistors 284 and 286 associated with potentiometer 276, while variable resistors 288 and 290 are trimming resistors to aid in making the resistance of 280 and 282 in the same ratio to resistors 284 and 286 respectively, as 272 is to 276. Movable contact 291 of potentiometer 62 and movable contact 292 of potentiometer 276 are connected respectively to the input terminals of amplifier 294. Capacitor 296 is also connected across the input terminals of amplifier 294 to aid in damping the recording circuit. Since both potentiometers 62 and 276 are supplied from the same direct voltage source, battery 274, when movable contacts 291 and 292 are positioned at the same relative location on their respective fixed resistance elements, no difference signal appears across the input terminals of amplifier 294. Accordingly, motor 298, connected to the output of amplifier 294, will not operate. However, if movable contact 291 is in a relatively different position than movable contact 292, a difference signal will appear at the input terminals of amplifier 294, causing motor 298 to position movable contact 292, to which it is mechanically connected, so that the same voltage appears at each input terminal. Motor 298 may also be used to drive a pen over a moving paper (not shown) when it drives movable contact 292, thus giving a record of variations in the position of potentiometer 62 as a function of time. As previously explained, the position of potentiometer 62 is determined by the refractive index of the fluid passing through the sample chamber at any given time. Thus a record of variation in the refractive index of the fluid passing through the sample chamber as a function of time may be obtained. Similarly motor 298 may be used to control a valve and thus control the concentration of chemicals in the sample stream to thereby maintain a substantially constant index of refraction. Since, the concentration of chemicals in the sample stream may determine the index of refraction, this would insure that the chemical composition of the stream remained constant, a necessary condition for some chemical processes.

Thus I have provided a refractometer capable of achieving the accuracy and precision of measurement of laboratory-type instruments, and yet having the features of construction necessary to permit its use in a plant as a process control instrument. The refractometer herein disclosed is enclosed in an explosion-proof housing designed to require a minimum of panel space and the optical path is folded by means of a mirror so that the entire refractometer forms a compact unit. Those parts of the refractometer which require cleaning and servicing are readily available at the front panel. To insure accurate measurement, all optical equipment is ruggedly mounted on heavy castings, which minimizes the effect of shock and temperature variations on the various parts of the system. The precision of my refractometer is increased by passing the light through the cell twice so that twice as great a deviation is obtained for a given difference in refractive index, and also by providing a beam splitting device to separate the refracted light from the sample cell between two photocells which has an infinitely narrow line of separation, i.e. the line between the silvered and the unsilvered portion of a half-silvered mirror.

I have also provided means for eliminating one of the major causes of inaccuracy in refractometers of the differential type, the difference in temperature between the reference and the sample fluid. For applications requiring extreme accuracy, I have provided a cell in which both the reference fluid and the sample fluid are circulated. When this cell is used, both fluids are circulated through a heat exchanger comprising a helix of two co-axial tubes before entering the cell; thus the fluids approach the same temperature before being measured. I have also provided a simpler cell for use when such accuracy is not required, in which the sample fluid flows around a non-flowing reference fluid prior to being measured, thus achieving a temperature similar to that of the reference fluid. By upwardly tilting the cell rather than the mirror behind the cell, I have minimized inaccuracies inherent in a two-compartment cell traversed by off-axis light. As shown in FIGURES 3, 5, 6, and 7, and fully described above, the preferred tilting amounts to about 2 degrees of pivotal tilt about an axis normal to the optical axis and lying in the "measuring plane" defined in FIGURE 2 by the source 18, the photocell detectors 44 and 46, and the center of mirror 40. By tilting the cell about a transverse axis lying in the "measuring plane," "ghost" reflections from the cell faces are prevented from entering the optical system.

The refractometer made according to my invention provides both external electrical and mechanical indication of the relative refractive index of the fluid whose refractive index is being measured. I have also provided for convenient calibration of the instruments by adjustment of a screw driver control available on the front panel to set the zero position of the refracted beam. Further, in the refractometer of my invention, I have eliminated the complexity of a so-called "tangent" drive by use of a worm and worm gear to drive restoring plate 60. These features of construction and arrangement of parts provide a refractometer which has the accuracy of laboratory type instruments, and yet is sufficiently rugged in construction, compact in size and readily serviceable that it can be used in industrial plants as a process control instrument.

It will thus be seen that the objects set forth above, among those made apparent from the preceding description, are efficiently attained and, since certain changes may be made in the above construction without departing from the scope of the invention, it is intended that all matters contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

I claim:

1. A refractometer for measuring the refractive index of a fluid test stream comprising, in combination, means forming a slit source of light, a lens positioned to collimate the light from said source to form a beam, a transparent cell having a reference fluid chamber and a fluid test stream chamber interposed in said beam, said cell being provided with transparent bounding entrance and exit plates forming opposite confining wall portions of said respective chambers and a common transparent wall plate separating said chambers and optically aligned with said bounding plates, and said cell being oriented to pass said beam through said transparent plates and chambers, heat-exchanging means constructed to permit direct heat interchange between said reference fluid chamber and said fluid test stream to minimize temperature differentials therebetween, a mirror positioned to reflect said beam back through said cell, said slit source being displaced from the optical axis of said system and defining with said axis a measuring plane, said cell being tilted about a transverse axis in said measuring plane with said transparent entrance plate being angularly offset by a small angle from a normal to said optical axis to deflect spurious reflections from said cell, and measuring apparatus positioned on the opposite side of the optical axis in said measuring plane and responsive to variations in the direction of said reflected beam caused by differences in the refractive indices of fluids in said two chambers, whereby changes in the fluid of the test stream may be detected.

2. A refractometer for measuring the refractive index of a fluid test stream comprising, in combination, means forming a slit source of light, a lens positioned to collimate the light from said source to form a beam, a transparent cell having a reference fluid chamber and a fluid test stream chamber interposed in said beam, said cell being provided with transparent bounding entrance and exit plates forming opposite confining wall portions of said respective chambers and a common transparent wall plate separating said chambers and optically aligned with said bounding plates, and said cell being oriented to pass said beam through said transparent plates and chambers, a mirror positioned to reflect said beam back through said cell, said slit source being displaced from the optical axis of said system and defining with said axis a measuring plane, said cell being tilted about a transverse axis in said measuring plane with said transparent entrance plate being angularly offset by a small angle from a normal to said optical axis to deflect spurious reflections from said cell, and measuring apparatus positioned on the opposite side of the optical axis in said measuring plane and responsive to variations in the direction of said reflected beam caused by differences in the refractive indices of fluids in said two chambers, whereby changes in the fluid of the test stream may be detected.

3. The refractometer defined in claim 2 in which said cell is angularly tilted about a transverse axis lying in the measuring plane and normal to the optical axis of the refractometer system.

4. The refractometer defined in claim 2 in which said measuring apparatus includes light-responsive means producing signals corresponding to said variations in direction, a servomotor actuated by said signals, a light beam deviation correcting means, and a linear drive means driven by said servomotor and connected to adjust said light beam deviation correcting means in response to said signals.

5. The refractometer defined in claim 4 in which said light beam deviation correcting means is a relatively thick transparent plate positioned in the path of light passing from said cell to said measuring apparatus, said plate being rotatably mounted for angular adjustment by said linear drive means.

6. The refractometer defined in claim 5 in which an additional relatively thick transparent plate whose rotary position may be manually adjusted is interposed between said slit source of light and said cell to adjust the position of said light beam.

7. The refractometer defined in claim 1 in which said measuring apparatus includes light-responsive means producing signals corresponding to said variations in direction, a servomotor actuated by said signals, a light beam deviation correcting means, and a linear drive means driven by said servomotor and connected to adjust said light beam deviation correcting means in response to said signals.

8. The refractometer defined in claim 7 in which said light beam deviation correcting means is a relatively thick transparent plate positioned in the path of light passing from said cell to said measuring apparatus, said plate being rotatably mounted for angular adjustment by said linear drive means.

9. The refractometer defined in claim 8 in which an additional relatively thick transparent plate whose rotary position may be manually adjusted is interposed between said slit source of light and said cell to adjust the position of said light beam.

10. The refractometer defined in claim 7 in which said linear drive means includes a worm driven by said servomotor and a gear in mesh with said worm and connected to position said light beam deviation correcting means.

11. A differential refractometer for measuring the refractive index of a fluid stream comprising, in combination, a substantially L-shaped housing, a vertical section of said housing adapted to be mounted on a panel and the horizontal section extending outwardly therefrom, means forming a slit source of light contained in the upper portion of said vertical section and directed downwardly, a transparent cell having two chambers confined by first and second housings mounted in said horizontal arm, a first one of said cell chambers being enclosed by said first housing and adapted to receive a reference fluid and the other of said chambers said fluid stream, said cell being provided with transparent bounding entrance and exit plates forming opposite confining wall portions of said respective chambers and a common transparent wall plate separating said chambers and optically aligned with said bounding plates, and said cell being oriented to pass said beam through said transparent plates and chambers, an annular passage in said first housing and around said first cell chamber, means for circulating said fluid stream through said annular passage and through said other chamber in said cell, whereby temperature differentials between said reference fluid and said fluid stream are substantially eliminated before said fluid stream enters said last-mentioned chamber, a mirror mounted at the base of said vertical arm to direct light from said slit source outwardly into the cell in a beam, a lens adapted to collimate light from said slit source interposed between said mirror and said cell, a second mirror mounted behind said cell to reflect said light beam which has passed once through said cell back through it a second time and measuring apparatus mounted in said vertical section of said housing responsive to variations in direction of said light beam emerging from said cell caused by differences in the refractive indices of the two fluids therein, said second mirror being normal to the optical axis of said lens and said slit source of light being positioned to one side of said optical axis, whereby the point of focus of the light beam emerging from said cell is located the same distance as said slit source on the other side of said axis, said cell being tilted with respect to said optical axis, with said transparent entrance plate being angularly offset by a small angle from a normal to said optical axis, thereby to minimize errors caused by light reflected from the transparent surface of said cell.

References Cited in the file of this patent

UNITED STATES PATENTS

| | | |
|---|---|---|
| 2,285,658 | Hitchcock | June 9, 1942 |
| 2,427,996 | Seaman | Sept. 23, 1947 |
| 2,569,127 | Eltenton | Sept. 25, 1951 |
| 2,583,973 | Stamm et al. | Jan. 29, 1952 |
| 2,724,304 | Crawford | Nov. 22, 1955 |
| 2,762,254 | Kegeles | Sept. 11, 1956 |
| 2,771,149 | Miller et al. | Nov. 20, 1956 |
| 2,783,676 | Lanneau et al. | Mar. 5, 1957 |
| 2,810,315 | Miller | Oct. 22, 1957 |
| 2,827,824 | Reinecke | Mar. 25, 1958 |
| 2,857,803 | Reinecke et al. | Oct. 28, 1958 |